(12) United States Patent
Long et al.

(10) Patent No.: US 11,328,644 B2
(45) Date of Patent: May 10, 2022

(54) ARRAY SUBSTRATE AND DISPLAY PANEL (71) Applicant: BOE TECHNOLOGY GROUP CO., LTD., Beijing (CN)

(72) Inventors: Chunping Long, Beijing (CN); Hui Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/255,920

(22) PCT Filed: May 13, 2020

(86) PCT No.: PCT/CN2020/089994
§ 371 (c)(1),
(2) Date: Dec. 23, 2020

(87) PCT Pub. No.: WO2020/238624
PCT Pub. Date: Dec. 3, 2020

(65) Prior Publication Data
US 2021/0264836 A1 Aug. 26, 2021

(30) Foreign Application Priority Data
May 24, 2019 (CN) .......................... 201920761515.1

(51) Int. Cl.
*G09G 3/20* (2006.01)
*G06F 3/041* (2006.01)

(52) U.S. Cl.
CPC ........... *G09G 3/20* (2013.01); *G06F 3/04162* (2019.05); *G09G 2300/0426* (2013.01); *G09G 2310/0275* (2013.01)

(58) Field of Classification Search
CPC ........ G02F 1/136218; G02F 1/136286; G09G 2310/0275; G09G 3/20; G09G 2300/0426; G06F 2203/04107
See application file for complete search history.

(56) References Cited

U.S. PATENT DOCUMENTS 6,982,770 B2    1/2006  Lim et al.
2016/0147123 A1*  5/2016  Cheng ................. H01L 27/1255
                                                    257/72
(Continued)

FOREIGN PATENT DOCUMENTS

CN    102385206 A    3/2012
CN    103676375 A    3/2014
(Continued)

*Primary Examiner* — Gerald Johnson
(74) *Attorney, Agent, or Firm* — Houtteman Law LLC (57) ABSTRACT

Provided are an array substrate and a display panel. The array substrate includes: gate lines and data lines on a substrate, the gate lines extending in a first direction, the data lines extending in a second direction, and the gate lines and the data lines crossing over each other to define pixel regions arranged in a matrix; pixel electrodes respectively in the plurality of pixel regions and on a side of the gate lines away from the substrate; common electrode lines at least partially surrounding the plurality of pixel regions; and a shielding electrode on a side of the gate lines away from the substrate and electrically connected to the common electrode lines, an orthographic projection of the shielding electrode on the substrate covering an orthographic projection of a portion, between the pixel electrodes adjacent in the second direction, of at least one of the gate lines on the substrate.

15 Claims, 4 Drawing Sheets

(56) References Cited

U.S. PATENT DOCUMENTS

2018/0081245 A1\* 3/2018 Xiao ................ G02F 1/133512
2020/0159354 A1\* 5/2020 Yoshida ................ G02F 1/1343

FOREIGN PATENT DOCUMENTS

CN 104701302 A 6/2015
CN 209859512 U 12/2019

\* cited by examiner

ARRAY SUBSTRATE AND DISPLAY PANEL

TECHNICAL FIELD

The present application belongs to the field of display technology, and particularly to an array substrate and a display panel.

BACKGROUND

In a conventional array substrate, via holes are provided in an insulating layer on adjacent common electrode lines, and ITO connection wires located above the common electrode lines and arranged in the same layer as pixel electrodes are connected with adjacent common electrode lines through the via holes in the insulating layer, thereby realizing the connection of the common electrode lines on the array substrate.

In an array substrate having the above structure, the pixel electrode is prone to have capacitive coupling with an adjacent pixel electrode, an adjacent gate line or an adjacent data line, so that the pixel voltage is unstable and prone to jump, resulting in display defects.

SUMMARY

In one aspect, the present disclosure provides an array substrate, including: a plurality of gate lines and a plurality of data lines on a substrate, the gate lines extending in a first direction, the data lines extending in a second direction, and the gate lines and the data lines crossing over each other to define a plurality of pixel regions arranged in a matrix; a plurality of pixel electrodes respectively located in the plurality of pixel regions and located on a side of the gate lines away from the substrate; common electrode lines at least partially surrounding the plurality of pixel regions; and a shielding electrode on a side of the gate lines away from the substrate and electrically connected to the common electrode lines, an orthographic projection of the shielding electrode on the substrate covering an orthographic projection of a portion, between the pixel electrodes adjacent in the second direction, of at least one of the gate lines on the substrate.

In some embodiments, an orthographic projection of the shielding electrode on the substrate covers an orthographic projection of an entire of the at least one gate line on the substrate.

In some embodiments, the shielding electrode further includes a portion extending in the second direction, and an orthographic projection of the portion of the shielding electrode on the substrate covers an orthographic projection of at least one of the data lines on the substrate.

In some embodiments, the gate lines, the data lines, and the pixel electrodes are disposed sequentially away from the substrate, the shielding electrode is disposed between a layer where the gate lines are located and a layer where the data lines are located in a vertical direction, and the shielding electrode is insulated from the gate lines and the data lines.

In some embodiments, the gate lines, the data lines, and the pixel electrodes are disposed sequentially away from the substrate, the shielding electrode is disposed between a layer where the data lines are located and a layer where the pixel electrodes are located in a vertical direction, and the shielding electrode is insulated from the data lines and the pixel electrodes.

In some embodiments, the gate lines, the data lines, and the pixel electrodes are disposed sequentially away from the substrate, and the shielding electrode is made of the same material and in the same layer as the data lines, and is insulated from the data lines.

In some embodiments, the array substrate further includes a touch electrode, the touch electrode is disposed on a side of the pixel electrodes away from the substrate, and the shielding electrode is made of the same material and in the same layer as the touch electrode, and is insulated from the touch electrode.

In some embodiments, the gate lines, the data lines, and the pixel electrodes are disposed sequentially away from the substrate, and the shielding electrode is in the same layer as the pixel electrodes, and is insulated from the pixel electrodes.

In some embodiments, the gate lines, the data lines, and the pixel electrodes are disposed sequentially away from the substrate, and the common electrode lines are in the same layer as the gate lines. The array substrate further includes: a first insulating layer between the gate lines and the data lines, and a second insulating layer between the data lines and the pixel electrodes. The shielding electrode is connected to the common electrode lines through via holes provided in the first insulating layer and the second insulating layer.

In some embodiments, each of the common electrode lines at least partially surrounds a row of the pixel regions. The array substrate further includes a connection wire extending along the second direction and electrically coupling two of the common electrode lines which surround pixel regions adjacent in the second direction, the connection wire being made of the same material and in the same layer as the pixel electrodes, and the connection wire being in direct contact with and electrically connected to the shielding electrode.

In some embodiments, an orthographic projection of the common electrode lines on the substrate is arranged around an orthographic projection of the pixel electrodes on the substrate.

In some embodiments, the gate lines are made of the same material and disposed in the same layer as the common electrode lines, and the shielding electrode is made of the same material as the pixel electrodes.

In some embodiments, each of the common electrode lines includes a first portion extending in the first direction and a second portion extending in the second direction, and the first portion and the second portion are in direct contact with and electrically connected to each other. The first portions of the common electrode lines in two of the pixel regions adjacent in the second direction are electrically connected by the connection wire.

In some embodiments, an orthographic projection of the common electrode lines on the substrate does not overlap an orthographic projection of the pixel electrodes on the substrate.

In one aspect, the present disclosure provides a display panel including any one of the array substrates described above.

DETAILED DESCRIPTION

To make those skilled in the art better understand the technical solutions of the present disclosure, an array substrate and a display panel according to embodiments of the present disclosure will be further described in detail below in conjunction with the accompanying drawings and specific embodiments.

Throughout the specification, two elements disposed in the same layer means that the two elements are formed by the same patterning process and/or using the same mask, and in some embodiments, the two elements may be located at the same level.

An embodiment of the present disclosure provides an array substrate, including: a plurality of gate lines and a plurality of data lines on a substrate, the gate lines extending in a first direction, the data lines extending in a second direction, and the gate lines and the data lines crossing over each other to define a plurality of pixel regions arranged in a matrix; a plurality of pixel electrodes respectively located in the plurality of pixel regions and located on a side of the gate lines away from the substrate; common electrode lines at least partially surrounding the plurality of pixel regions; and a shielding electrode on a side of the gate lines away from the substrate and electrically connected to the common electrode lines, an orthographic projection of the shielding electrode on the substrate covering an orthographic projection of a portion, between the pixel electrodes adjacent in the second direction, of at least one of the gate lines on the substrate.

As shown in FIG. 1 and FIGS. 4A to 4C, the array substrate includes a substrate 1, and gate lines 2, common electrode lines 3, and data lines 4 disposed on the substrate 1, a plurality of pixel regions defined by the gate lines 2 and the data lines 4 crossing over each other, a pixel electrode 5 is disposed in each pixel region, the gate lines 2, the data lines 4, and the pixel electrodes 5 are disposed sequentially away from the substrate 1. The array substrate further includes a shielding electrode 6, the shielding electrode 6 is disposed on the gate lines 2 and electrically connected to the common electrode lines 3, and an orthographic projection of the shielding electrode 6 on the substrate 1 covers an orthographic projection of a portion of the gate lines 2 on the substrate 1, the portion of the gate lines 2 being located between adjacent pixel electrodes 5.

By providing the shielding electrode 6, coupling capacitance between the adjacent pixel electrodes 5 and coupling capacitance between the pixel electrodes 5 and a portion of the gate lines 2 can be shielded, thereby alleviating the capacitive coupling between adjacent pixel electrodes 5 and between the pixel electrodes 5 and the gate lines 2, stabilizing the pixel voltage, and ensuring normal display.

In this embodiment, the gate lines 2 and the common electrode lines 3 are made of the same material and are disposed in the same layer, and the shielding electrode 6 and the pixel electrodes 5 are disposed in the same layer and are made of the same material, thereby reducing the manufacturing process steps. The shielding electrode 6 is insulated from the pixel electrodes 5, a first insulating layer 10 is arranged between the gate lines 2 and the data lines 4, and a second insulating layer 11 is arranged between the data lines 4 and the pixel electrodes 5. The shielding electrode 6 is connected to the common electrode lines 3 through via holes 13 provided in the first insulating layer 10 and the second insulating layer 12. By doing so, the shielding electrode 6 can alleviate the capacitive coupling between adjacent pixel electrodes 5 and between the pixel electrodes 5 and the gate lines 2, so that the pixel voltage tends to be stable, and the normal display is ensured.

Figure 1:
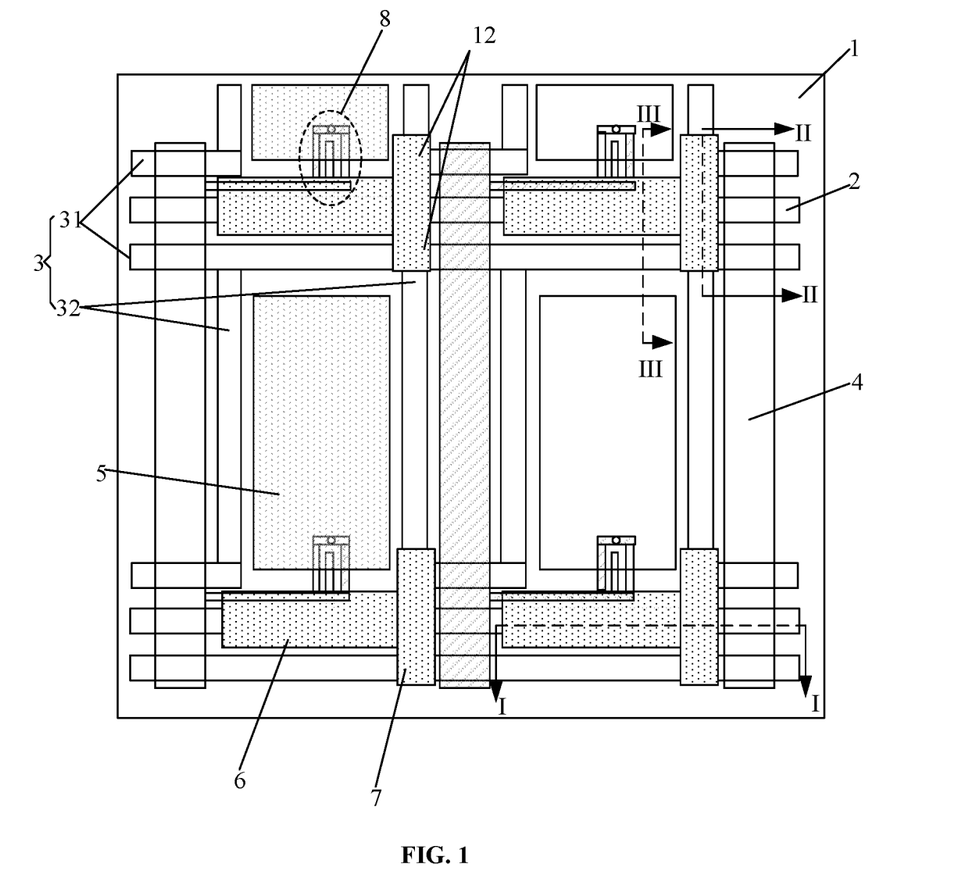
FIG. 1 is a plan view of an array substrate according to an embodiment of the present disclosure.

In this embodiment, a switching transistor 8 is further disposed in the pixel region. The switching transistor 8 includes a gate electrode connected to the gate line 2, a source electrode connected to the data line 4, and a drain electrode connected to the pixel electrode 5. The electrical connection/disconnection of the pixel electrodes 5 and the data lines 4 is controlled by turning on/off the switching transistor 8, thereby controlling display of the pixels.

In this embodiment, each of the common electrode lines 3 at least partially surrounds one row of the pixel regions, and the array substrate further includes a connection wire 7 extending along the second direction and electrically connecting two common electrode lines 3 surrounding the pixel regions adjacent in the second direction, in other words, at least some of the common electrode lines 3 between two adjacent pixel regions are connected by the connection wire 7. In some embodiments, the connection wire 7 and the pixel electrode 5 are made of the same material and are arranged in the same layer, and the connection wire 7 is in direct contact with and electrically connected to the shielding electrode 6. The connection wire 7 may further cover the gate lines 2, thereby further alleviating capacitive coupling between adjacent pixel electrodes 5 and between the pixel electrodes 5 and the gate lines 2, and stabilizing the pixel voltage.

In this embodiment, an orthographic projection of the common electrode lines 3 on the substrate 1 surrounds an orthographic projection of the pixel electrodes 5 on the substrate 1. As such, a uniform electric field can be formed between the common electrodes (not shown in the drawings) connected to the common electrode lines 3 and the pixel electrodes 5, which facilitate the realizing of better display effect of the display panel adopting the array substrate.

In this embodiment, the gate lines 2 are perpendicular to the data lines 4. The common electrode line 3 includes a first portion 31 extending in a first direction (e.g., parallel to the gate lines 2) and a second portion 32 extending in a second direction (e.g., parallel to the data lines 4). The first portion 31 and the second portion 32 of the common electrode line 3 are in direct contact and electrically connected to each other, and the first portions 31 of the common electrode lines 3 in two pixel regions adjacent in the second direction are electrically connected by the connection wire 7. By doing so, the common voltage on the common electrode line 3 is more uniform, which facilitates a uniform electric field formed between the common electrodes connected with the common electrode lines 3 and the pixel electrodes 5, and further facilitates the realizing of better display effect of the display panel adopting the array substrate.

In this embodiment, the orthographic projection of the common electrode lines 3 on the substrate 1 does not overlap with the orthographic projection of the pixel electrodes 5 on the substrate 1, for example, is between orthographic projections of two adjacent pixel electrodes 5 on the substrate 1. In some embodiments, an orthographic projection of the lateral common electrode lines 3 on the substrate 1 is located in a gap region between the orthographic projections of the two adjacent pixel electrodes 5 on the substrate 1, and an orthographic projection of the longitudinal common electrode lines 3 on the substrate 1 partially overlaps with the orthographic projection of the two adjacent pixel electrodes 5 on the substrate 1. In other words, most of the common electrode lines 3 are located in an opaque area (an area where the black matrix is located) of the array substrate, and since the common electrode lines 3 and the gate lines 2 are made of the same material and the common electrode lines 3 are opaque, an aperture ratio of a display panel using the array substrate is not affected by such an arrangement.

Figure 2:
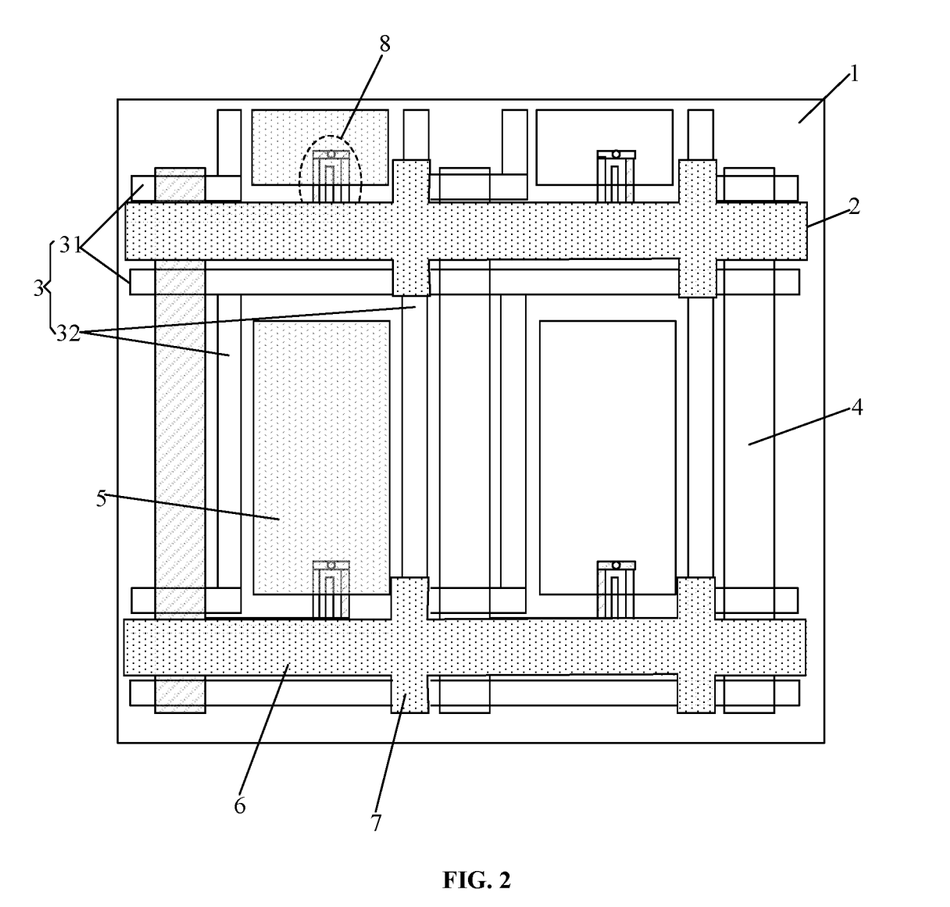
FIG. 2 is a plan view of an array substrate according to an embodiment of the present disclosure.

An embodiment of the present disclosure provides an array substrate, which differs from the embodiments described with reference to FIG. 1 and FIGS. 4A to 4C in that, as shown in FIG. 2, an orthographic projection of the shielding electrode 6 on the substrate 1 covers an orthographic projection of an entire gate line 2 on the substrate 1.

By making the orthographic projection of the shielding electrode 6 on the substrate 1 to cover the entire gate line 2, the capacitive coupling between the adjacent pixel electrodes 5 and between the pixel electrodes 5 and the gate lines 2 can be further shielded, so that the capacitive coupling between the adjacent pixel electrodes 5 and between the pixel electrodes 5 and the gate line 2 is further alleviated, the pixel voltage tends to be stable, and the normal display is ensured.

Other structures of the array substrate in this embodiment are the same as those in the embodiment described with reference to FIG. 1 and FIGS. 4A to 4C, and are not repeated herein.

Figure 3:
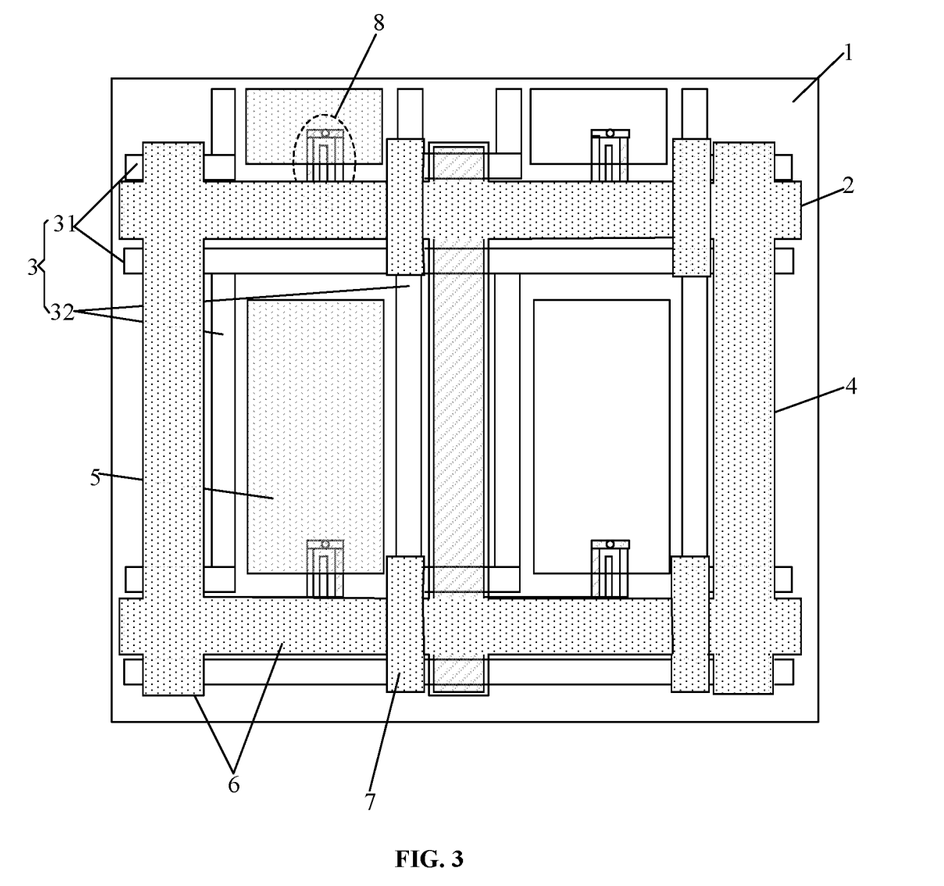
FIG. 3 is a plan view of an array substrate according to an embodiment of the present disclosure.
Figure 4A:
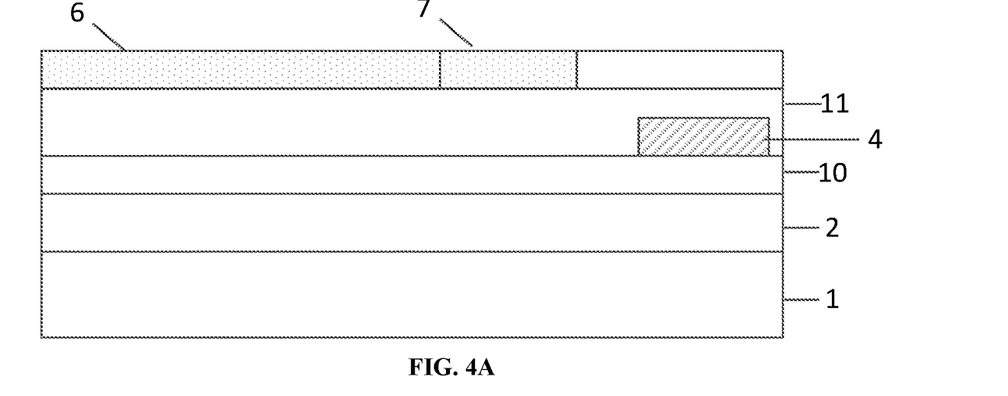
FIGS. 4A, 4B and 4C are cross-sectional views of an array substrate according an embodiment of the present disclosure, taken along lines I-I, II-II and III-III of FIG. 1, respectively.
Figure 4B:
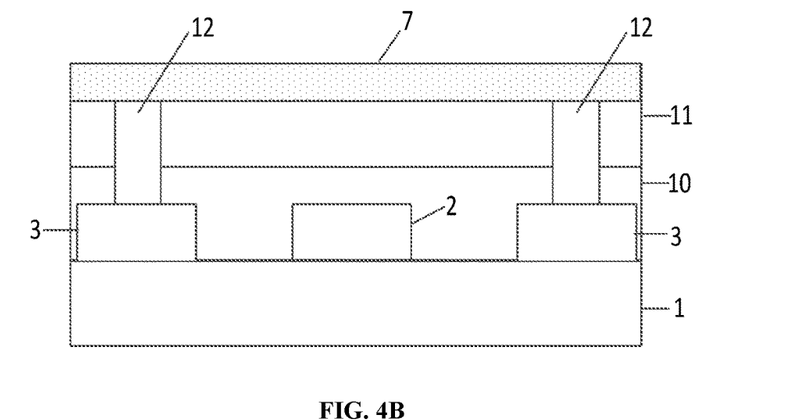
Figure 4C:
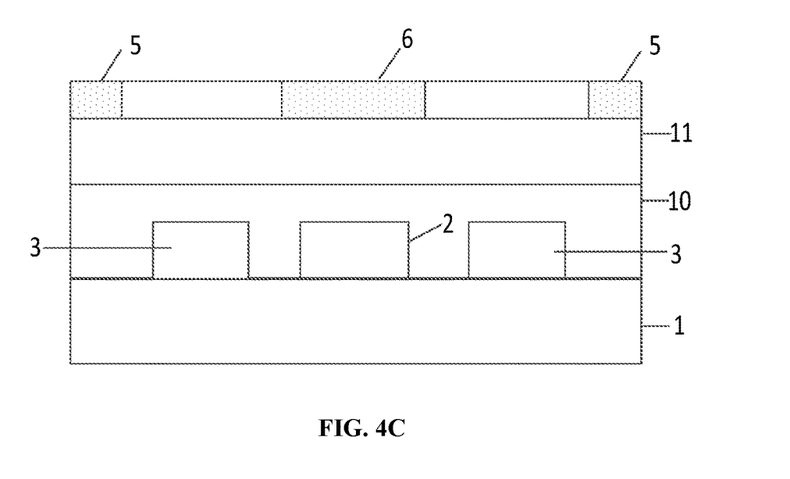

An embodiment of the present disclosure provides an array substrate, which differs from the above embodiments in that, as shown in FIG. 3, the shielding electrode 6 further includes a portion extending in the second direction, and an orthographic projection of the portion of the shielding electrode 6 on the substrate 1 covers an orthographic projection of the entire data line 4 on the substrate 1.

By doing so, the coupling capacitance between adjacent pixel electrodes 5, the coupling capacitance between the pixel electrodes 5 and part of the gate lines 2 and the coupling capacitance between the pixel electrodes 5 and the data lines 4 can be shielded, so that the capacitive coupling between adjacent pixel electrodes 5, between the pixel electrodes 5 and the gate lines 2 and between the pixel electrodes 5 and the data lines 4 can be further alleviated or avoided, the pixel voltage tends to be more stable, and normal display can be further ensured.

Other structures of the array substrate in this embodiment are the same as those in the above embodiments, and are not described herein again.

An embodiment of the present disclosure provides an array substrate, which differs from the above embodiments in that the shielding electrode is disposed between a layer where the gate lines are located and a layer where the data lines are located, and the shielding electrode is insulated from the gate lines and the data lines.

By doing so, the shielding electrode can also play a role in shielding the coupling capacitance between adjacent pixel electrodes, the coupling capacitance between the pixel electrodes and part of gate lines and the coupling capacitance between the pixel electrodes and the data lines, so that capacitive coupling between adjacent pixel electrodes, between the pixel electrodes and the gate lines and between the pixel electrodes and the data lines is alleviated or avoided, the pixel voltage tends to be stable, and normal display is ensured.

Other structures of the array substrate in this embodiment are the same as those in any of the above embodiments, and are not described herein again.

An embodiment of the present disclosure provides an array substrate, which differs from the above embodiments in that the shielding electrode is disposed between a layer where a data line is located and a layer where a pixel electrode is located, and the shielding electrode is insulated from the data line and the pixel electrode.

With the arrangement, the shielding electrode can also play a role in shielding coupling capacitance between adjacent pixel electrodes, coupling capacitance between the pixel electrodes and part of gate lines and coupling capacitance between the pixel electrodes and the data lines, so that capacitive coupling between the adjacent pixel electrodes, between the pixel electrodes and the gate lines and between the pixel electrodes and the data lines is reduced or avoided, the pixel voltage tends to be stable, and normal display is ensured.

Other structures of the array substrate in this embodiment are the same as those in any of the above embodiments, and are not described herein again.

An embodiment of the present disclosure provides an array substrate, which differs from the above embodiments in that the shielding electrode is made of the same material and disposed in the same layer as the data lines, and the shielding electrode is insulated from the data lines.

With the shielding electrode and the data lines made of the same material, the process steps can be reduced. The shielding electrode arranged in the same layer as the data lines can also play a role in shielding coupling capacitance between adjacent pixel electrodes, coupling capacitance between the pixel electrodes and part of gate lines and coupling capacitance between the pixel electrodes and the data lines, so that capacitive coupling between the adjacent pixel electrodes, between the pixel electrodes and the gate lines and between the pixel electrodes and the data lines is reduced or avoided, the pixel voltage tends to be stable, and normal display is ensured.

Other structures of the array substrate in this embodiment are the same as those in any of the above embodiments, and are not described herein again.

The embodiment of the present disclosure provides an array substrate, which differs from the above embodiment in that the array substrate further includes a touch electrode (not shown in the figure), the touch electrode is disposed on a side of the pixel electrodes away from the substrate, the shielding electrode and the touch electrode are made of the same material and disposed in the same layer, and the shielding electrode is insulated from the touch electrode.

With the shielding electrode and the touch electrode made of the same material, the process steps can be reduced. The shielding electrode arranged in the same layer as the touch electrode can also play a role in shielding coupling capacitance between adjacent pixel electrodes, coupling capacitance between the pixel electrodes and part of gate lines and coupling capacitance between the pixel electrodes and the data lines, so that capacitive coupling between the adjacent pixel electrodes, between the pixel electrodes and the gate lines and between the pixel electrodes and the data lines is reduced or avoided, the pixel voltage tends to be stable, and normal display is ensured.

Other structures of the array substrate in this embodiment are the same as those in any of the above embodiments, and are not described herein again.

In the array substrate according to the above embodiments, by providing the shielding electrode, the coupling capacitance between adjacent pixel electrodes, the coupling capacitance between the pixel electrodes and the gate lines, and the coupling capacitance between the pixel electrodes and the data lines can be at least partially shielded, so that the capacitive coupling between adjacent pixel electrodes, between the pixel electrodes and the gate lines, and between the pixel electrodes and the data lines is alleviated or avoided, the pixel voltage tends to be stable, and normal display is ensured.

An embodiment of the present disclosure provides a display panel including the array substrate in any one of the above embodiments.

By adopting the array substrate in any of the above embodiments, the stability of the pixel voltage is ensured when the display panel displays, thereby improving the display quality of the display panel.

It can be understood that the foregoing embodiments are merely exemplary embodiments used for describing the principle of the present disclosure, but the present disclosure is not limited thereto. Those of ordinary skill in the art may make various variations and improvements without departing from the spirit and essence of the present invention, and these variations and improvements shall also fall into the protection scope of the present disclosure.

What is claimed is:

1. An array substrate, comprising:
a plurality of gate lines and a plurality of data lines on a substrate, the gate lines extending in a first direction, the data lines extending in a second direction, and the gate lines and the data lines crossing over each other to define a plurality of pixel regions arranged in a matrix;
a plurality of pixel electrodes in the plurality of pixel regions, respectively, and on a side of the gate lines away from the substrate;
common electrode lines at least partially surrounding the plurality of pixel regions; and
a shielding electrode on a side of the gate lines away from the substrate and electrically connected to the common electrode lines, an orthographic projection of the shielding electrode on the substrate covering an orthographic projection of a portion, between the pixel electrodes adjacent in the second direction, of at least one of the gate lines on the substrate,
wherein the gate lines, the data lines, and the pixel electrodes are sequentially away from the substrate, and the shielding electrode satisfies one of (i) to (iii):
(i) the shielding electrode is between a layer where the gate lines are located and a layer where the data lines are located in a vertical direction, and the shielding electrode is insulated from the gate lines and the data lines,
(ii) the shielding electrode is between a layer where the data lines are located and a layer where the pixel electrodes are located in a vertical direction, and the shielding electrode is insulated from the data lines and the pixel electrodes, and
(iii) the shielding electrode is made of the same material and in the same layer as the data lines, and is insulated from the data lines.

2. The array substrate of claim 1, wherein an orthographic projection of the shielding electrode on the substrate covers an orthographic projection of an entire of the at least one gate line on the substrate.

3. The array substrate of claim 2, wherein the shielding electrode further comprises a portion extending in the second direction, and an orthographic projection of the portion of the shielding electrode on the substrate covers an orthographic projection of at least one of the data lines on the substrate.

4. An array substrate, comprising:
a plurality of gate lines and a plurality of data lines on a substrate, the gate lines extending in a first direction, the data lines extending in a second direction, and the gate lines and the data lines crossing over each other to define a plurality of pixel regions arranged in a matrix;
a plurality of pixel electrodes in the plurality of pixel regions, respectively, and on a side of the gate lines away from the substrate;
common electrode lines at least partially surrounding the plurality of pixel regions; and
a shielding electrode on a side of the gate lines away from the substrate and electrically connected to the common electrode lines, an orthographic projection of the shielding electrode on the substrate covering an orthographic projection of a portion, between the pixel electrodes adjacent in the second direction, of at least one of the gate lines on the substrate,
wherein the gate lines, the data lines, and the pixel electrodes are sequentially away from the substrate, and the shielding electrode is in the same layer as the pixel electrodes, and is insulated from the pixel electrodes, and
wherein the gate lines, the data lines, and the pixel electrodes are sequentially away from the substrate, and the common electrode lines are in the same layer as the gate lines,
the array substrate further comprises a first insulating layer between the gate lines and the data lines, and a second insulating layer between the data lines and the pixel electrodes, and
the shielding electrode is connected to the common electrode lines through via holes provided in the first insulating layer and the second insulating layer.

5. The array substrate of claim 4, wherein each of the common electrode lines at least partially surrounds a row of the pixel regions, and
the array substrate further comprises a connection wire extending along the second direction and electrically coupling two of the common electrode lines which surround pixel regions adjacent in the second direction, the connection wire being made of the same material and in the same layer as the pixel electrodes, and the connection wire being in direct contact with and electrically connected to the shielding electrode.

6. The array substrate of claim 5, wherein an orthographic projection of the common electrode lines on the substrate is around an orthographic projection of the pixel electrodes on the substrate.

7. The array substrate of claim 4, wherein the gate lines are made of the same material and in the same layer as the common electrode lines, and the shielding electrode is made of the same material as the pixel electrodes.

8. The array substrate of claim 6, wherein each of the common electrode lines comprises a first portion extending in the first direction and a second portion extending in the second direction, and the first portion and the second portion are in direct contact with and electrically connected to each other, and
the first portions of the common electrode lines in two of the pixel regions adjacent in the second direction are electrically connected by the connection wire.

9. An array substrate, comprising:
a plurality of gate lines and a plurality of data lines on a substrate, the gate lines extending in a first direction, the data lines extending in a second direction, and the gate lines and the data lines crossing over each other to define a plurality of pixel regions arranged in a matrix;

a plurality of pixel electrodes in the plurality of pixel regions, respectively, and on a side of the gate lines away from the substrate;

common electrode lines at least partially surrounding the plurality of pixel regions; and a shielding electrode on a side of the gate lines away from the substrate and electrically connected to the common electrode lines, an orthographic projection of the shielding electrode on the substrate covering an orthographic projection of a portion, between the pixel electrodes adjacent in the second direction, of at least one of the gate lines on the substrate, wherein an orthographic projection of the common electrode lines on the substrate does not overlap an orthographic projection of the pixel electrodes on the substrate.

10. A display panel, comprising the array substrate of claim 1.

11. The array substrate of claim 4, wherein each of the common electrode lines at least partially surrounds a row of the pixel regions, and the array substrate further comprises a connection wire extending along the second direction and electrically coupling two of the common electrode lines which surround pixel regions adjacent in the second direction, the connection wire being made of the same material and in the same layer as the pixel electrodes, and the connection wire being in direct contact with and electrically connected to the shielding electrode.

12. A display panel, comprising the array substrate of claim 2.

13. A display panel, comprising the array substrate of claim 3.

14. A display panel, comprising the array substrate of claim 4.

15. A display panel, comprising the array substrate of claim 9.

* * * * *